(12) United States Patent
Kawai et al.

(10) Patent No.: US 10,964,978 B2
(45) Date of Patent: Mar. 30, 2021

(54) ELECTRIC STORAGE DEVICE HAVING A WOUND BODY WITH AN EXTENSION PART

(71) Applicant: Murata Manufacturing Co., Ltd., Nagaokakyo (JP)

(72) Inventors: Toru Kawai, Nagaokakyo (JP); Masahiro Otsuka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 125 days.

(21) Appl. No.: 16/157,380

(22) Filed: Oct. 11, 2018

(65) Prior Publication Data

US 2019/0044189 A1 Feb. 7, 2019

Related U.S. Application Data

(63) Continuation of application No. PCT/JP2017/005430, filed on Feb. 15, 2017.

(30) Foreign Application Priority Data

May 31, 2016 (JP) .............................. JP2016-108295

(51) Int. Cl.
*H01M 10/0587* (2010.01)
*H01G 11/26* (2013.01)
*H01G 11/10* (2013.01)
*H01M 10/052* (2010.01)
*H01M 10/04* (2006.01)
*H01G 11/52* (2013.01)

(52) U.S. Cl.
CPC ........ *H01M 10/0587* (2013.01); *H01G 11/10* (2013.01); *H01G 11/26* (2013.01);
(Continued)

(58) Field of Classification Search
CPC .......... H01M 10/0587; H01M 10/052; H01M 10/0431; H01M 2220/30; H01M 10/0436; H01G 11/10; H01G 11/52; H01G 11/26
(Continued)

(56) References Cited

U.S. PATENT DOCUMENTS 10,128,526 B2 11/2018 Kwon et al.
2014/0050958 A1* 2/2014 Kwon ............... H01M 10/0583
429/94

(Continued)

FOREIGN PATENT DOCUMENTS

JP 2014522558 A 9/2014
JP 2014524131 A 9/2014
(Continued)

OTHER PUBLICATIONS

International Search Report issued for PCT/JP2017/005430, dated Mar. 14, 2017.
(Continued)

*Primary Examiner* — Gary D Harris
(74) *Attorney, Agent, or Firm* — Arent Fox LLP

(57) ABSTRACT

An electric storage device that includes a first electrode body and a second electrode body. The first electrode body includes a first wound body part and an extension part. The first wound body part includes a laminated body having a positive electrode, a negative electrode, and a separator disposed between the positive electrode and the negative electrode. The second electrode body is on the extension part. The length of the second electrode body is different from that of the first wound body part of the first electrode body in a direction in which a central axis of the first wound body part extends.

17 Claims, 4 Drawing Sheets

(52) U.S. Cl.
CPC ........ *H01G 11/52* (2013.01); *H01M 10/0431* (2013.01); *H01M 10/052* (2013.01); *H01M 10/0436* (2013.01); *H01M 2220/30* (2013.01)

(58) Field of Classification Search
USPC .......................................................... 429/94
See application file for complete search history.

(56) References Cited

U.S. PATENT DOCUMENTS

| | | |
|---|---|---|
| 2014/0050959 A1 | 2/2014 | Ryu et al. |
| 2014/0234682 A1* | 8/2014 | Kwon ............... H01M 10/0463 429/94 |
| 2015/0010800 A1 | 1/2015 | Park et al. |
| 2015/0288021 A1 | 10/2015 | Kwon et al. |
| 2016/0126597 A1 | 5/2016 | Ryu et al. |

FOREIGN PATENT DOCUMENTS

| | | |
|---|---|---|
| JP | 2015008094 A | 1/2015 |
| JP | 2015506563 A | 3/2015 |
| JP | 2015509654 A | 3/2015 |
| JP | 2015534226 A | 11/2015 |

OTHER PUBLICATIONS

Written Opinion of the International Searching Authority issued for PCT/JP2017/005430, dated Mar. 14, 2017.

\* cited by examiner

ELECTRIC STORAGE DEVICE HAVING A WOUND BODY WITH AN EXTENSION PART

CROSS REFERENCE TO RELATED APPLICATIONS

The present application is a continuation of International application No. PCT/JP2017/005430, filed Feb. 15, 2017, which claims priority to Japanese Patent Application No. 2016-108295, filed May 31, 2016, the entire contents of each of which are incorporated herein by reference.

FIELD OF THE INVENTION

The present invention relates to an electric storage device.

BACKGROUND OF THE INVENTION

Recently, the sizes and thicknesses of electronic devices have been reduced. Accordingly, restrictions on the disposition space of an electric storage device mounted in an electronic device have become stricter. For example, there is a desire to dispose an electric storage device in a space that is not rectangular parallelepiped. For example, Patent Document 1 discloses an electric storage device (battery assembly) not having a rectangular parallelepiped shape. The battery assembly disclosed in Patent Document 1 does not have a rectangular shape in side view.

Patent Document 1: Published Japanese Translation of PCT Application No. 2014-524131

SUMMARY OF THE INVENTION

There is a desire for an electric storage device not having a rectangular shape in plan view from an upper surface of the electric storage device.

A main object of the present invention is to provide an electric storage device not having a rectangular shape in plan view from an upper surface of the electric storage device.

An electric storage device according to the present invention includes a first electrode body and a second electrode body. The first electrode body has a wound body and an extension part. The wound body is formed of a laminated body including a positive electrode, a negative electrode, and a separator disposed between the positive electrode and the negative electrode, and is formed by winding the laminated body. The extension part extends from the wound body and is formed of an end part of the laminated body on one side. The second electrode body is provided on the extension part. A length of the second electrode body is different from a length of the wound body of the first electrode body in a direction in which a central axis of the wound body of the first electrode body extends.

In the electric storage device according to the present invention, the length of the second electrode body provided on the extension part in the direction in which the central axis of the wound body of the first electrode body extends is different from the length of the wound body of the first electrode body in the direction. Accordingly, the present invention can provide an electric storage device not having a rectangular shape in plan view.

In the electric storage device according to the present invention, the second electrode body may include a wound body formed by winding a laminated body including a positive electrode, a negative electrode, and a separator disposed between the positive electrode and the negative electrode.

In the electric storage device according to the present invention, the second electrode body may be formed of a laminated body including a sheet positive electrode, a sheet negative electrode laminated on the positive electrode, and a separator provided between the positive electrode and the negative electrode.

In the electric storage device according to the present invention, the first electrode body and the second electrode body may have different resistance values per unit capacitance.

In the electric storage device according to the present invention, the length of the second electrode body in the direction in which the central axis of the wound body of the first electrode body extends may be shorter than the length of the wound body of the first electrode body in the direction.

In the electric storage device according to the present invention, the first electrode body and the second electrode body may be electrically connected with each other at the extension part of the first electrode body.

The present invention can provide an electric storage device not having a rectangular shape in plan view.

DETAILED DESCRIPTION OF THE INVENTION

Figure 1:
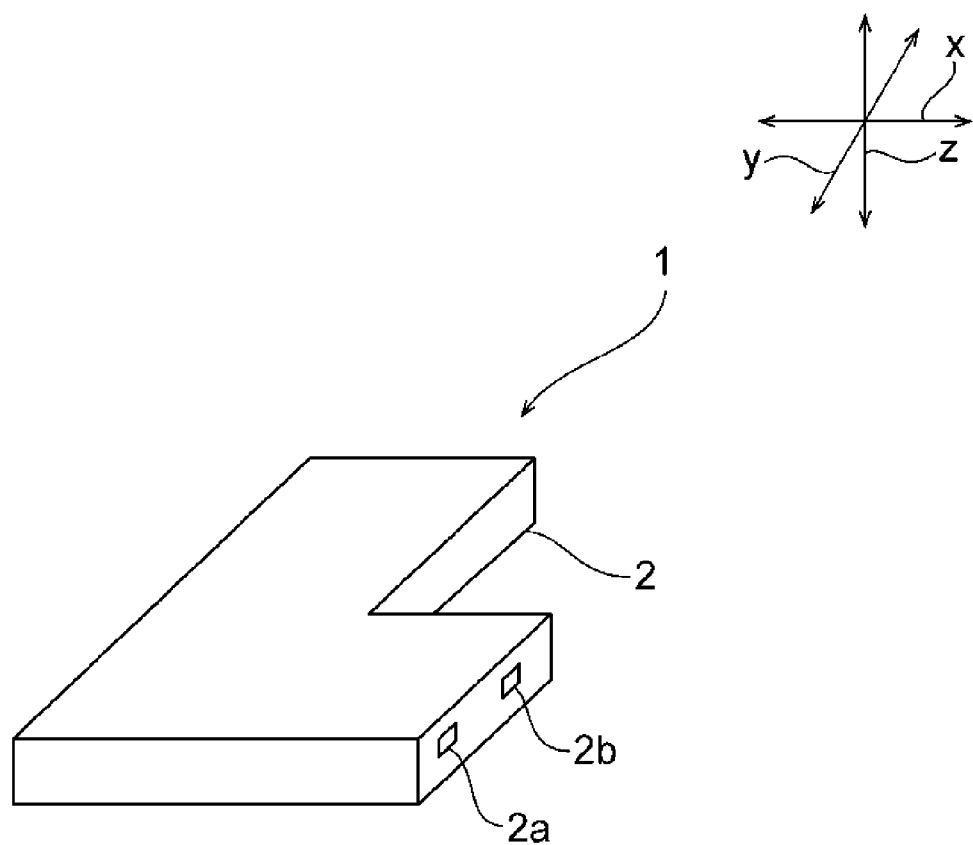
FIG. 1 is a schematic perspective view of an electric storage device according to a first embodiment.

Exemplary preferred embodiments of the present invention will be described below. The following embodiments are merely exemplary. The present invention is not limited to the following embodiments.

In drawings referred to in the embodiments and the like, components having effectively identical functions will be denoted by an identical reference sign. The drawings referred to in the embodiments and the like are schematically illustrated and the dimensional ratios of objects illustrated in the drawings may be different from the dimensional ratio of actual objects, and/or the dimensional ratios of objects may also different between the drawings.

First Embodiment

Figure 2:
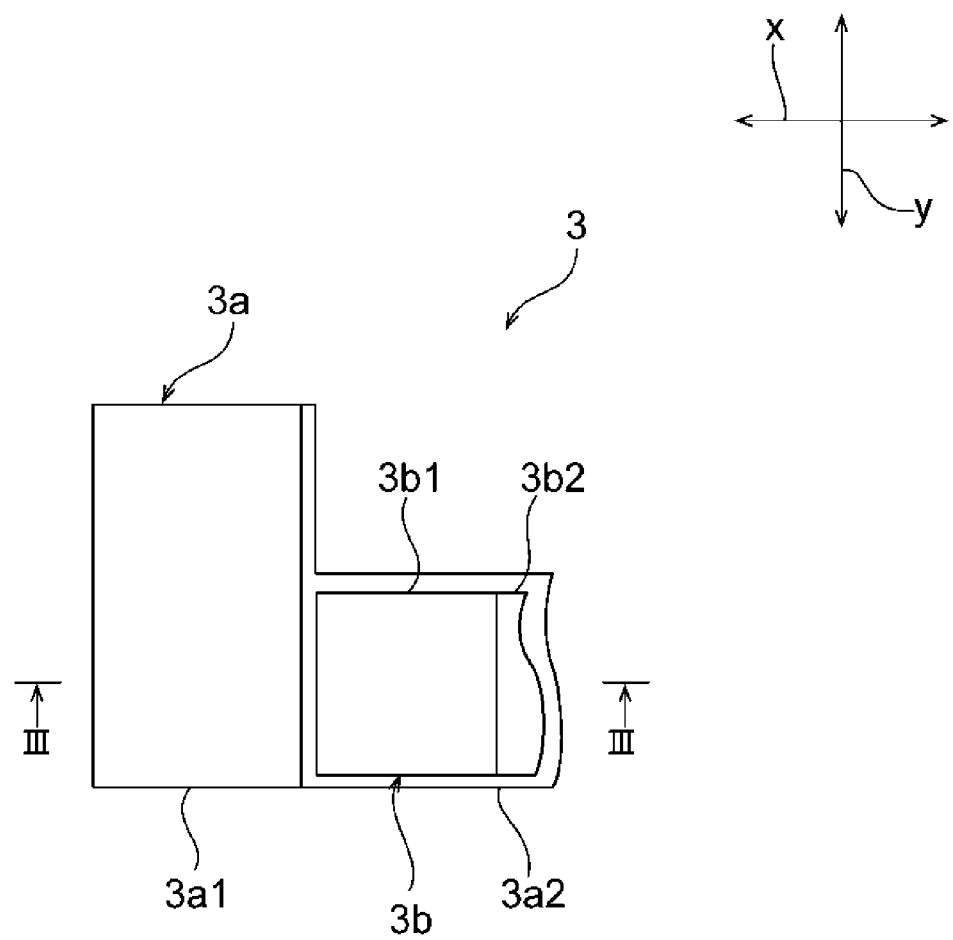
FIG. 2 is a schematic plan view of an electrode body according to the first embodiment.
Figure 3:
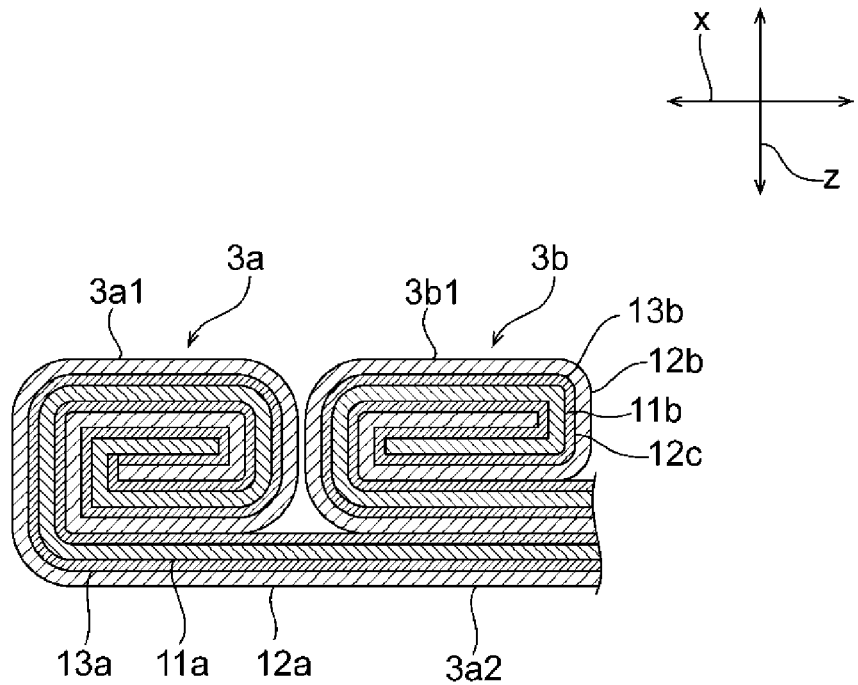
FIG. 3 is a schematic cross-sectional view of the electrode body taken along line III-III in FIG. 2.

FIG. 1 is a schematic perspective view of an electric storage device according to a first embodiment. FIG. 2 is a schematic plan view of an electrode body according to the first embodiment. FIG. 3 is a schematic cross-sectional view of the electrode body taken along line III-III in FIG. 2.

This electric storage device 1 illustrated in FIG. 1 may be, for example, a battery such as a secondary battery, or a capacitor such as an electric double-layer capacitor.

As illustrated in FIG. 1, the electric storage device 1 includes a case 2. The case 2 does not have a rectangular shape in plan view from an upper surface thereof. The case 2 may have, for example, an L shape, an H shape, a U shape, a T shape, or the like. Thus, in the present invention, the case may have any shape that is not rectangular in the plan view.

The case 2 may be made of a conductor or an insulator. The case 2 may be made of, for example, metal such as aluminum, stainless steel, or copper, laminate foil, or resin.

A first terminal 2a and a second terminal 2b are provided on one side surface of the case 2. One of the first terminal 2a and the second terminal 2b functions as a positive electrode terminal, and the other functions as a negative electrode terminal. However, in the present invention, it is not always necessary to provide both the positive electrode terminal and the negative electrode terminal. For example, only the positive electrode terminal may be provided, and the conductive case 2 may function as the negative electrode terminal. The first terminal 2a and the second terminal 2b may be provided directly on the side surface of the case 2, or may be extended from the side surface of the case 2 through a tab.

An electrode body 3 illustrated in FIG. 3 is disposed inside the case 2. FIG. 3 only illustrates part of the electrode body 3, omitting illustration of a terminal part of the electrode body.

The electrode body 3 has a shape complimentary to the shape of the case 2 in the plan view from the upper surface thereof. Specifically, in the present embodiment, the case 2 and the electrode body 3 are each provided in an L shape. For example, when the case has an H shape, the electrode body is provided in an H shape. When the case has a U shape, the electrode body is provided in a U shape.

The electrode body 3 includes a first electrode body 3a and a second electrode body 3b.

As illustrated in FIG. 3, the first electrode body 3a is formed of a laminated body including a positive electrode 11a, a negative electrode 12a, and a separator 13a disposed between the positive electrode 11a and the negative electrode 12a and insulating the positive electrode 11a and the negative electrode 12a from each other. The first electrode body 3a includes a wound body 3a1 obtained by winding the laminated body, and an extension part 3a2 formed of an end part of the laminated body on one side and extending from the wound body 3a1. The wound body 3a1 is provided in a substantially rectangular parallelepiped shape. The extension part 3a2 extends in parallel to one surface of the substantially rectangular parallelepiped wound body 3a1.

As illustrated in FIGS. 2 and 3, the second electrode body 3b is provided on the extension part 3a2. The second electrode body 3b and the extension part 3a2 may or may not be bonded to each other.

As illustrated in FIG. 3, the second electrode body 3b is formed of a laminated body including a positive electrode 11b, a negative electrode 12b, and a separator 13b disposed between the positive electrode 11b and the negative electrode 12b and insulating the positive electrode 11b and the negative electrode 12b from each other. As illustrated in FIGS. 2 and 3, the second electrode body 3b includes a wound body 3b1 obtained by winding the laminated body, and an extension part 3b2 formed of an end part of the laminated body on one side and extending from the wound body 3b1. The wound body 3b1 is provided in a substantially rectangular parallelepiped shape. The extension part 3b2 extends in parallel to one surface of the substantially rectangular parallelepiped wound body 3b1, which contacts with the extension part 3a2.

The length of the extension part 3a2 of the first electrode body 3a along the y-axis direction is substantially equal to the length of the second electrode body 3b along the y-axis direction.

In the present embodiment, as illustrated in FIG. 2, the length of the wound body 3a1 of the first electrode body and the length of the second electrode body 3b are different from each other in the y-axis direction, in which the central axis of the wound body 3a1 extends. With this configuration, the electrode body 3 does not have a rectangular shape in the plan view, and thus, the electric storage device 1 does not have a rectangular shape in the plan view. In addition, in the present embodiment, since both the first and second electrode bodies 3a and 3b are of a wound type, cost reduction of the electric storage device 1 can be achieved.

In the present embodiment, the winding direction of the wound body 3a1 and the winding direction of the wound body 3b1 are same. With this configuration, it is easy to collect current collectively from the extension part (tab) 3a2 extending from the wound body 3a1 and the extension part (tab) 3b2 extending from the wound body 3b1, and thus the extension parts 3a2 and 3b2 can be easily connected with the terminals 2a and 2b.

When the second electrode body 3b is provided on the extension part 3a2 of the first electrode body 3a as in the present embodiment, the wound body 3a1 of the first electrode body and the second electrode body 3b are not affected by dimensional change in the wound body 3a1 of the first electrode body and the second electrode body 3b in the thickness direction at charging and discharging. This improves dimensional stability of the electric storage device 1.

In the present embodiment, since both the first and second electrode bodies 3a and 3b are wound bodies, the thicknesses of the wound body 3a1 of the first electrode body 3a and the wound body 3b1 of the second electrode body 3b in the Z-axis direction can be made different from each other by, for example, differentiating the number of windings between the wound body 3a1 and the wound body 31. In this manner, the electric storage device can have a step also in the Z-axis direction.

When the plurality of electrode bodies 3a and 3b are included as in the electric storage device 1, for example, the electric storage device can have both a high capacitance and a low resistance by differentiating the resistance value per unit capacitance between the plurality of electrode bodies 3a and 3b. For example, when the first electrode body 3a is an electrode body of a high capacitance and a high resistance, and the second electrode body 3b is an electrode body of a low capacitance and a low resistance, the electric storage device can have both a high capacitance and a low resistance.

In the present embodiment, the wound body 3a1 of the first electrode body 3a is longer than the wound body 3b1 of the second electrode body 3b in the y-axis direction, in which the central axis of the wound body 3a1 extends. However, the present invention is not limited to this configuration. For example, the wound body of the first electrode body may be shorter than the wound body of the second electrode body. In this case, too, the electrode body does not have a rectangular shape in the plan view, and thus the electric storage device not having a rectangular shape in the plan view can be obtained.

In the present embodiment, the separators 13a and 13b are provided on both sides of the respective positive electrodes 11a and 11b. With this configuration, the negative electrode 12a of the first wound body 3a1 and the negative electrode 12b of the second wound body 3b1 are not in contact with each other in FIG. 3. However, the negative electrode 12a of the first wound body 3a1 and the negative electrode 12b of the second wound body 3b1 may be in contact with each other to become equipotential.

In the present embodiment, the central axis of the wound body 3a1 and the central axis of the wound body 3a2 extend in parallel to each other. However, the present invention is not limited to this configuration. The central axis of the wound body 3a1 and the central axis of the wound body 3a2 may extend in directions different from each other. For example, the central axis of the wound body 3a1 and the central axis of the wound body 3a2 may extend in directions substantially orthogonal to each other.

The configurations of the positive electrodes 11a and 11b may be appropriately determined depending on the type of the electric storage device 1. The positive electrode 11a and the positive electrode 11b may be made of substantially the same material or different materials. For example, when the electric storage device 1 is a secondary battery, the positive electrodes 11a and 11b may each include a positive electrode collector, and an active material layer provided on at least one surface of the positive electrode collector. In this case, a positive electrode active material and the like contained in the positive electrode 11a may be same as or different from a positive electrode active material and the like contained in the positive electrode 11b. For example, when the electric storage device 1 is an electric double-layer capacitor, the positive electrodes 11a and 11b may each include a positive electrode collector, and a polarizable electrode layer provided on at least one surface of the positive electrode collector. In addition, the positive electrode 11a and the positive electrode 11b may have same or different capacitances per unit area in the positive electrode active material layer.

The configurations of the negative electrodes 12a and 12b may be appropriately determined depending on the type of the electric storage device 1. The negative electrode 12a and the negative electrode 12b may be made of substantially the same material or different materials. For example, when the electric storage device 1 is a secondary battery, the negative electrodes 12a and 12b may each include a negative electrode collector, and an active material layer provided on at least one surface of the negative electrode collector. In this case, a negative electrode active material and the like contained in the negative electrode 12a may be same as or different from a negative electrode active material and the like contained in the negative electrode 12b. For example, when the electric storage device 1 is an electric double-layer capacitor, the negative electrodes 12a and 12b may each include a negative electrode collector, and a polarizable electrode layer provided on at least one surface of the negative electrode collector. In addition, the negative electrode 12a and the negative electrode 12b may have same or different capacitances per unit area in the negative electrode active material layer.

The separators 13a and 13b may be each made of, for example, a porous sheet including open cells through which ions in an electrolyte are movable. The separator 13a of the first electrode body 3a and the separator 13b of the second electrode body 3a may be made of the same material or different materials.

The separators 13a and 13b may be each made of, for example, polypropylene, polyethylene, polyimide, cellulose, aramid, polyvinylidene fluoride, or Teflon (registered trademark). The separators 13a and 13b may each have a surface covered by a ceramic court layer or a bonding layer. The surface of each of the separators 13a and 13b may have a bonding property. The separators 13a and 13b may be each a single-layer film made of one kind of material, or may be each a composite film or multi-layered film made of one or two or more kinds of material.

In place of the separators 13a and 13b or in addition to the separators 13a and 13b, an insulation layer such as a ceramic coat layer may be provided on the surface of each of the positive electrodes 11a and 11b and the negative electrodes 12a and 12b.

In each of the positive electrodes 11a and 11b and the negative electrodes 12a and 12b, an undercoat layer containing, for example, carbon may be provided between the collector and the active material layer.

The separators 13a and 13b are impregnated with an electrolyte. The electrolyte contains a solute and a solvent. When the electric storage device 1 is a secondary battery, examples of the solute used preferably include Li salt such as $LiPF_6$ and $LiBF_4$. When the electric storage device 1 is a secondary battery, examples of the solvent used preferably include organic solvents such as ethylene carbonate (EC), propylene carbonate (PC), dimethyl carbonate (DMC), ethyl methyl carbonate (EMC), and diethyl carbonate (DEC). The electrolyte may be liquid or polymer.

Other exemplary preferable embodiments of the present invention will be described below. In the following description, a component having a function effectively identical to that in the above-described first embodiment will be denoted by an identical reference sign, and description thereof will be omitted.

Second Embodiment

Figure 4:
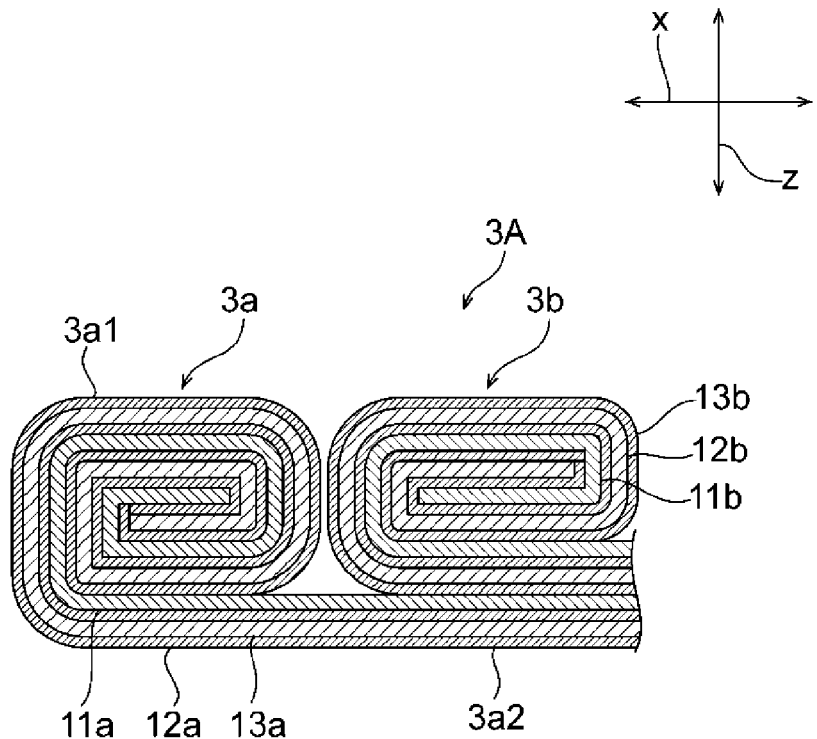
FIG. 4 is a schematic cross-sectional view of an electrode body according to a second embodiment.

FIG. 4 is a schematic cross-sectional view of an electrode body according to a second embodiment.

In the first embodiment, the separators 13a and 13b are disposed on both sides of the respective positive electrodes 11a and 11b. However, the present invention is not limited to this configuration. For example, as illustrated in FIG. 4, the separators 13a and 13b may be disposed on both sides of the respective negative electrodes 12a and 12b.

Third Embodiment

Figure 5:
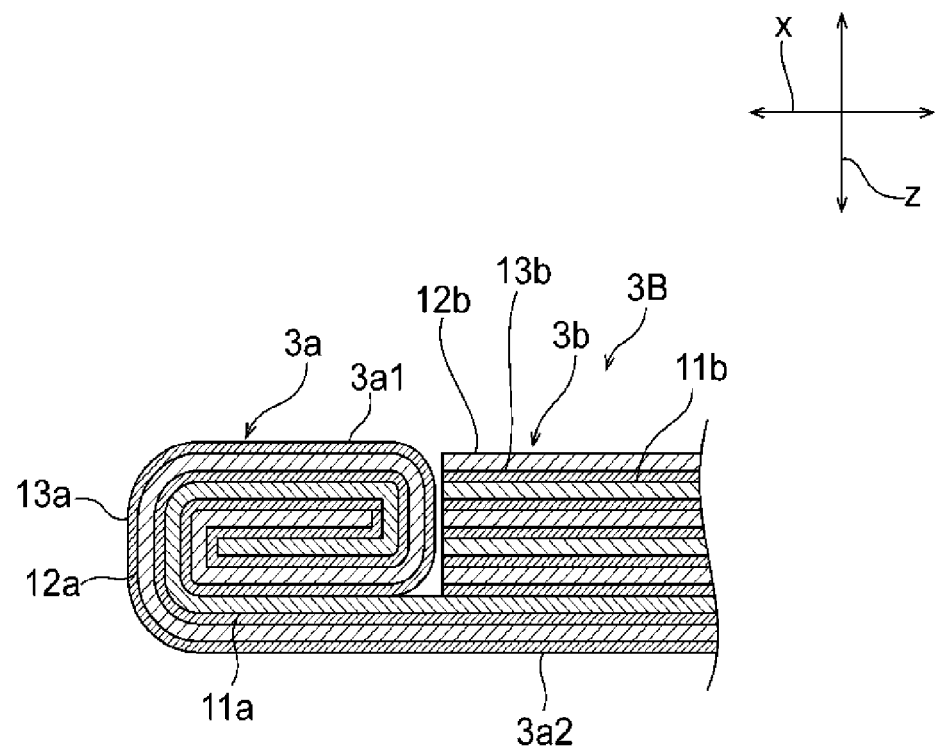
FIG. 5 is a schematic cross-sectional view of an electrode body according to a third embodiment.

FIG. 5 is a schematic cross-sectional view of an electrode body according to a third embodiment.

In the first and second embodiments, the second electrode body 3b is of a wound type. However, the present invention is not limited to this configuration. For example, as illustrated in FIG. 5, the second electrode body 3b may be a stacked type including a sheet positive electrode 11b, a sheet negative electrode 12b, and a separator 13b provided between the positive electrode 11b and the negative electrode 12b. In this case, for example, the separator 13b may have a sheet shape as illustrated in FIG. 5, a fold-back shape, or a winding shape including the positive electrode 11b and the negative electrode 12b.

When the second electrode body 3b is of a stacked type as in the present embodiment, the second electrode body 3b can be formed in a non-rectangular shape, which leads to further increase in the degree of freedom of the shape of the electric storage device 1.

Fourth Embodiment

Figure 6:
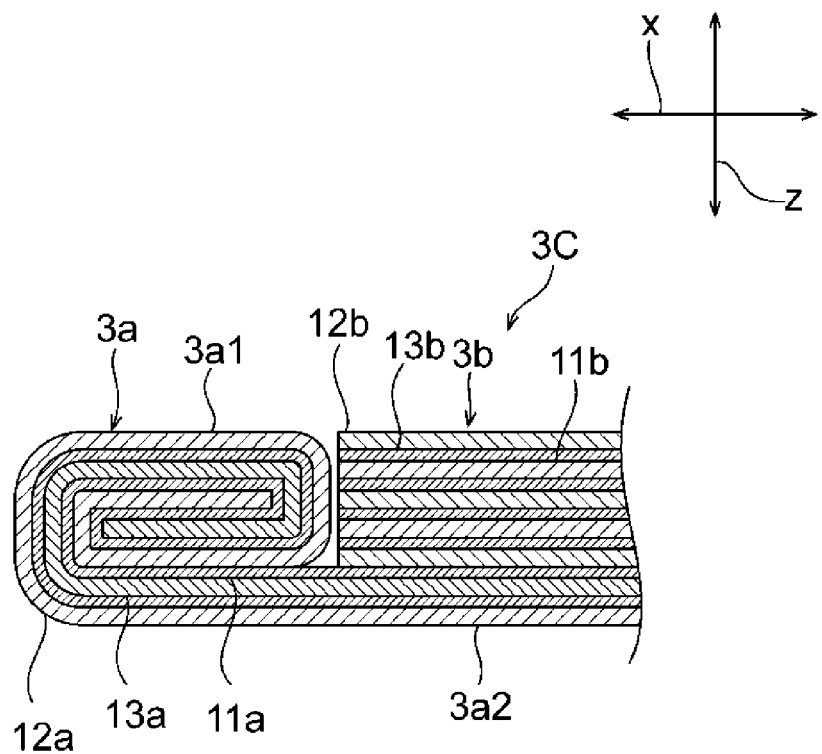
FIG. 6 is a schematic cross-sectional view of an electrode body according to a fourth embodiment.

FIG. 6 is a schematic cross-sectional view of an electrode body according to a fourth embodiment.

In the third embodiment, the separator 13a is provided on both sides of the negative electrode 12b. However, the present invention is not limited to this configuration. For example, as illustrated in FIG. 6, the separators 13a may be provided on both sides of the positive electrode 12a.

DESCRIPTION OF REFERENCE SYMBOLS

1: Electric storage device
2: Case
2a: first terminal
2b: second terminal
3: Electrode body
3a: first electrode body
3a1: wound body
3a2: extension part
3b: second electrode body
3b1: wound body
3b2: extension part
11a, 11b: Positive electrode
12a, 12b: Negative electrode
13a, 13b: Separator

The invention claimed is:

1. An electric storage device comprising:
a first electrode body including a first laminated body having a first positive electrode, a first negative electrode, and a first separator disposed between the first positive electrode and the first negative electrode, the first electrode body having:
a first wound body part containing the first positive electrode, the first negative electrode, and the first separator; and
an extension part being an extension of and containing the first positive electrode, the first negative electrode, and the first separator, and extending away from and past an end part of the first wound body part; and
a second electrode body on the extension part and having a first length different from a second length of the first wound body part of the first electrode body in a direction in which a central axis of the first wound body part extends.

2. The electric storage device according to claim 1, wherein the second electrode body includes a second wound body part having a second positive electrode, a second negative electrode, and a second separator disposed between the second positive electrode and the second negative electrode.

3. The power storage device according to claim 2, wherein a first winding direction of the first wound body part and a second winding direction of the second wound body part are identical to each other.

4. The power storage device according to claim 2, further comprising a third separator disposed such that the first positive electrode is between the first separator and the third separator.

5. The power storage device according to claim 2, further comprising a third separator disposed such that the first negative electrode is between the first separator and the third separator.

6. The power storage device according to claim 4, further comprising a fourth separator disposed such that the second positive electrode is between the second separator and the fourth separator.

7. The power storage device according to claim 5, further comprising a fourth separator disposed such that the second negative electrode is between the second separator and the fourth separator.

8. The power storage device according to claim 1, further comprising a second separator disposed such that the first positive electrode is between the first separator and the second separator.

9. The power storage device according to claim 1, further comprising a second separator disposed such that the first negative electrode is between the first separator and the second separator.

10. The electric storage device according to claim 1, wherein the second electrode body is a second laminated body including a stacked arrangement of a second positive electrode, a second negative electrode, and a second separator provided between the second positive electrode and the second negative electrode.

11. The power storage device according to claim 10, further comprising a third separator disposed such that the first positive electrode is between the first separator and the third separator.

12. The power storage device according to claim 10, further comprising a third separator disposed such that the first negative electrode is between the first separator and the third separator.

13. The power storage device according to claim 11, further comprising a fourth separator disposed such that the second positive electrode is between the second separator and the fourth separator.

14. The power storage device according to claim 12, further comprising a fourth separator disposed such that the second negative electrode is between the second separator and the fourth separator.

15. The electric storage device according to claim 1, wherein the first electrode body and the second electrode body have different resistance values per unit capacitance.

16. The electric storage device according to claim 1, wherein the first length of the second electrode body in the direction in which the central axis of the first wound body part extends is shorter than the second length of the first wound body part.

17. The electric storage device according to claim 1, wherein the first electrode body and the second electrode body are electrically connected with each other at the extension part.

* * * * *